G. R. NEBINGER.
Churns.

No. 154,707. Patented Sept. 1, 1874.

Witnesses
A. P. Grant.
N. N. Finckel

Inventor
George R. Nebinger.
by John A. Wiedersheim
Atty

UNITED STATES PATENT OFFICE.

GEORGE R. NEBINGER, OF PHILADELPHIA, PENNSYLVANIA.

IMPROVEMENT IN CHURNS.

Specification forming part of Letters Patent No. 154,707, dated September 1, 1874; application filed August 10, 1874.

*To all whom it may concern:*

Be it known that I, GEORGE R. NEBINGER, of the city and county of Philadelphia and the State of Pennsylvania, have invented a new and useful Improvement in Churns; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
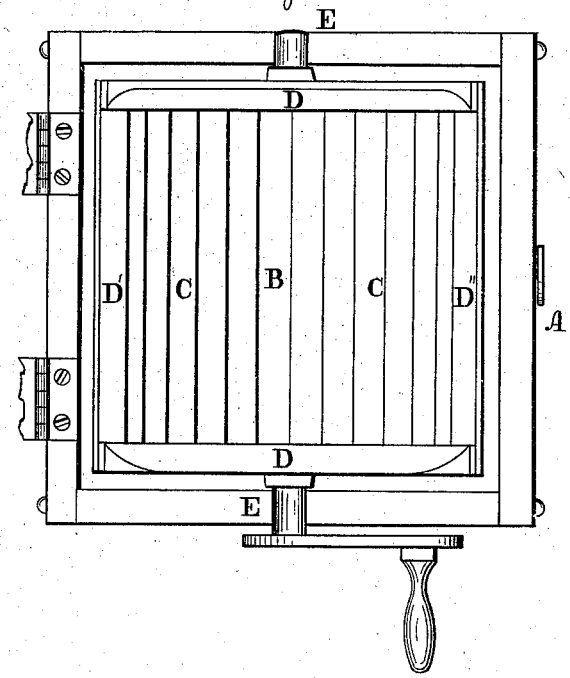
Figure 2:
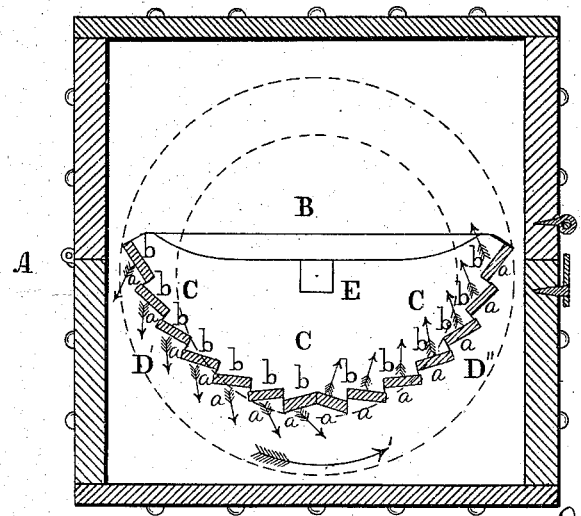

Figure 1 is a top view of the inside of the churn. Fig. 2 is a central longitudinal vertical section thereof.

Similar letters of reference indicate corresponding parts in the two figures.

My invention consists of a semi-elliptical cradle-like dasher, constructed of end pieces and slatted sides, the end pieces pivoted near the top to the ends of the churn-body, in which it swings, the slats at the bottom inclining downward and outward, the inclination diminishing in each pair until it becomes reversed at the extremities.

Referring to the drawings, A represents the body of the churn, which is preferably of quadrilateral form. B represents the dasher, which consists of a series of separated slats, C, secured to heads or end pieces D, to which is connected the axis or center E, on which the dasher rotates. The heads D are of the form of the half of an ellipse, and the slats are arranged in two series, D′ D″, and are secured to the surface thereof in lines tangential to said surface, so that each slat is set diagonally to an imaginary line radiating from the center and passing through the slat. Each slat of both series has two faces, one face, $a$, being diagonally downward and outward, and the other face, $b$, being diagonally upward and inward. Again, each slat has a different radius, the shortest and longest radiuses being shown, respectively, by the two dotted circles, Fig. 2, the radiuses of the other slats being intermediate of said circles.

It will be observed that the dasher, as described, forms the figure of half of an elliptic body, being open above, and its surface constructed of the slats, having spaces between them, and arranged on the sides or heads D, as has been stated. Or, in other words, the slats at the bottom incline downward and outward, the inclination diminishing in each pair until it becomes reversed at the extremities.

The operation is as follows: By properly operating the crank of the dasher the latter receives rotary motion, either to the right or left, as desired. The series of slats that first enter the cream become the forward slats. In the present case the series D″ have that title, the rotation of the dasher being in the direction of the arrow 1. The outer faces of the slats of the series D′ force the cream outward from the center, and each slat operates in a different radius, so that the cream is driven or forced outwardly in as many different points or circles as there are slats in the series D′. While this operation is in progress, the faces $b$ of the series of slats D″ are forcing the cream inwardly, and as the slats of said series also have different radiuses, it is evident that the cream is driven or forced inwardly in as many points or circles as there are slats in the series D″.

This combined driving or forcing of the cream both inwardly and outwardly, and in different radiuses, the action of the cream as it strikes various points of the angular body A, thus changing its course, and the passage of the cream between the slats, cause great agitation of the cream and the consequent quick production of the butter.

Owing to the trough-form of the dasher the butter will gather therein, and is readily removable therefrom by lifting said dasher from the body A.

Having thus described my invention, what I claim as new, and desire to secure by Letters Patent, is—

1. The semi-elliptical cradle-like dasher, consisting of end pieces and slatted sides, the end pieces pivoted near the top to the ends of the churn-body, in which it swings, substantially as and for the purpose of set forth.

2. The semi-elliptical cradle-like dasher, consisting of end pieces and slatted sides, the end pieces pivoted near the top to the ends of the churn-body, in which it swings, the slats at the bottom inclining downward and outward, the inclination diminishing in each pair until it becomes reversed at the extremities, substantially as and for the purpose set forth.

GEORGE R. NEBINGER.

Witnesses:
JOHN A. WIEDERSHEIM,
JOHN G. BOWMAN.